United States Patent
Oh

(10) Patent No.: US 7,750,713 B2
(45) Date of Patent: Jul. 6, 2010

(54) SPREAD SPECTRUM CLOCK GENERATOR

(75) Inventor: Young-Hoon Oh, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

(21) Appl. No.: 12/005,500

(22) Filed: Dec. 26, 2007

(65) Prior Publication Data
US 2009/0058489 A1 Mar. 5, 2009

(30) Foreign Application Priority Data
Aug. 30, 2007 (KR) .................. 10-2007-0087592

(51) Int. Cl.
*H03K 3/00* (2006.01)
(52) U.S. Cl. .................. 327/291; 327/294; 327/299
(58) Field of Classification Search .................. 327/291, 327/293, 294, 299, 261, 163, 264, 276, 278
See application file for complete search history.

(56) References Cited

U.S. PATENT DOCUMENTS

| | | | | |
|---|---|---|---|---|
| 6,144,242 A * | 11/2000 | Jeong et al. | .................. | 327/269 |
| 6,501,307 B1 * | 12/2002 | Yen | .................. | 327/113 |
| 6,856,180 B1 * | 2/2005 | Starr et al. | .................. | 327/147 |
| 7,010,014 B1 * | 3/2006 | Percey et al. | .................. | 375/130 |
| 7,061,293 B2 | 6/2006 | Fukushima | | |
| 7,098,709 B2 * | 8/2006 | Ido et al. | .................. | 327/156 |
| 7,233,210 B2 * | 6/2007 | Kaizuka | .................. | 331/1 A |
| 7,295,048 B2 * | 11/2007 | Gilliland | .................. | 327/122 |
| 7,355,461 B2 * | 4/2008 | Nagashima et al. | .................. | 327/134 |
| 7,616,038 B2 * | 11/2009 | Oh | .................. | 327/172 |
| 2001/0005877 A1 | 6/2001 | Hattori | | |

FOREIGN PATENT DOCUMENTS

JP 2005-148972 A 6/2005
KR 10-0621809 B1 9/2006

OTHER PUBLICATIONS

Hardin, K.B., et al., "Spread Spectrum Clock Generation for the Reduction of Radiated Emissions," IEEE International Symposium on Electromagnetic Compatability (1994), pp. 227-231.

* cited by examiner

*Primary Examiner*—Hai L Nguyen
(74) *Attorney, Agent, or Firm*—Blakely, Sokoloff, Taylor & Zafman LLP

(57) ABSTRACT

A spread spectrum clock generator for sequentially modulating a source clock of a fixed frequency with a predetermined frequency range, including: a plurality of first loading units configured to delay clock edges of the source clock by a delay time corresponding to the number of unit delay steps determined by delay step control signals, wherein each of the first loading units comprises a plurality of second loading units each of which is configured to vary a delay value of each unit delay step by changing an inner interconnection configuration thereof in response to unit delay step control signals.

15 Claims, 7 Drawing Sheets

INITIAL STATE

AFTER DELAYING CLOCK
BY ONE UNIT DELAY STEP

AFTER DELAYING CLOCK
BY FIVE UNIT DELAY STEPS

SPREAD SPECTRUM CLOCK GENERATOR

CROSS-REFERENCE TO RELATED APPLICATIONS

The present invention claims priority of Korean patent application number 10-2007-0087592, filed on Aug. 30, 2007, which is incorporated by reference in its entirety.

BACKGROUND OF THE INVENTION

The present invention relates to a semiconductor design technology, and more particularly, to a spread spectrum clock generator.

Recently, vigorous researches are being made on reduction of electromagnetic interference (EMI) caused by an electromagnetic radiation in a semiconductor device such as a double data rate synchronous DRAM (DDR SDRAM). The frequency of an operation clock increases and the interconnection lengths in an electronic circuit and a substrate decreases with the rapid development of the semiconductor technology, causing rapid increase of the EMI generation. In addition, because the fine and highly integrated interconnections also serve as antennas, the electromagnetic radiation increases further and thus the EMI generation also increases further.

A spread spectrum clock generator (SSCG) is a device for reducing the EMI generation. The spread spectrum clock generator sequentially modulates a frequency of an operation clock so that the energy concentrated on a specific frequency range is uniformly distributed over a much wider frequency range.

FIG. 1 is a circuit diagram illustrating a conventional spread spectrum clock generator.

Referring to FIG. 1, the conventional spread spectrum clock generator includes a first PMOS transistor PM1, a second PMOS transistor PM2, a first NMOS transistor NM1, a second NMOS transistor NM2, a first falling loading unit 110, a second falling loading unit 170, a first rising loading unit 130, and a second rising loading unit 150. The first PMOS transistor PM1 and the first NMOS transistor NM1 have gates receiving a fixed clock CLK_F of a constant frequency. The first falling loading unit 110 is connected between the first PMOS transistor PM1 and a first node A, whereas the first rising loading unit 130 is connected between the first NMOS transistor NM1 and the first node A. The second PMOS transistor PM2 and the second NMOS transistor NM2 have gates coupled to the first node A. The second rising loading unit 150 is connected between the second PMOS transistor PM2 and an output terminal for outputting a modulated clock CLK_M. The second falling loading unit 170 is connected between the second NMOS transistor NM2 and the output terminal.

The first rising loading unit 130 and the second rising loading unit 150 delay a rising edge of the fixed clock CLK_F by a delay time corresponding to a predetermined number of unit delay steps. The first falling loading unit 110 and the second falling loading unit 170 delay a falling edge of the fixed clock CLK_F by a delay time corresponding to a predetermined number of unit delay steps.

That is, the loading units 110, 130, 150 and 170 delay the rising edge and the falling edge of the fixed clock CLK_F by the delay time corresponding to the predetermined number of unit delay steps, thereby sequentially modifying the fixed clock CLK_F while keeping a duty ratio at 50:50.

FIG. 2 is a circuit diagram illustrating a circuit configuration of the first rising loading unit 130 of the typical spread spectrum clock generator shown in FIG. 1.

All the loading units 110, 130, 150 and 170 may have substantially the same circuit configuration. However, to a different loading unit may be input a different set of delay step control signals CTR0, CTR1, CTR2, CTR3, CTR4, CTR5, CTR6 and CTR7.

Referring to FIG. 2, the first rising loading unit 130 has eight resistors R0, R1, R2, R3, R4, R5 R6 and R7 and eight transfer gates TG0, TG1, TG2, TG3, TG4, TG5, TG6 and TG7. All the eight resistors have the same resistance. The transfer gates TG0, TG1, TG2, TG3, TG4, TG5, TG6 and TG7 correspond to the respective resistors R0, R1, R2, R3, R4, R5, R6 and R7. The transfer gates TG0, TG1, TG2, TG3, TG4, TG5, TG6 and TG7 allow the respective resistors R0, R1, R2, R3, R4, R5, R6 and R7 to be bypassed in response to the respective delay step control signals CTR0, CTR1, CTR2, CTR3, CTR4, CTR5, CTR6 and CTR7.

Therefore, the first rising loading unit 130 delays the clock edge of the fixed clock CLK_F by a delay time corresponding to the number of the resistors which the fixed clock CLK_F have passed through according to the delay step control signals CTR0, CTR1, CTR2, CTR3, CTR4, CTR5, CTR6 and CTR7.

FIGS. 3A to 3C are timing diagrams illustrating a time delay performed by the first rising loading unit 130 of the conventional spread spectrum clock generator shown in FIG. 1.

FIG. 3A shows a timing diagram of the modulated clock CLK_M generated by delaying the fixed clock CLK_F by only a basic delay time $t_o$. FIG. 3B shows a timing diagram of the modulated clock CLK_M generated by delaying the fixed clock CLK_F by a basic delay time $t_o$ and a delay time t corresponding to one unit delay step. FIG. 3C shows a timing diagram of the modulated clock CLK_M generated by delaying the fixed clock CLK_F by a basic delay time $t_o$ and a delay time 5t corresponding to five unit delay steps.

The delay time corresponding to the number of the unit delay steps refers to a total delay time performed by the first rising loading unit 130.

FIG. 4 illustrates the modulated clock CLK_M generated by delaying the fixed clock CLK_F by delay times determined at the loading units 110, 130, 150 and 170 of the conventional spread spectrum clock generator shown in FIG. 1.

Referring to FIG. 4, there are shown the fixed clock CLK_F, the modulated clock CLK_M, the number of unit delay steps R applied to the rising edge of the fixed clock CLK_F, the number of unit delay steps F applied to the falling edge of the fixed clock CLK_F and a cycle of the modulated clock CLK_M. For convenience, the basic delay time $t_o$ described above with reference to FIG. 3 is disregarded and the delay time corresponding to one unit delay step is supposed to be t.

A first cycle of the modulated clock CLK_M has the same cycle as that of the fixed clock CLK_F, i.e., period T, because only the basic delay time is applied to rising and falling edges of the fixed clock CLK_F. One unit delay step is applied to a falling edge of a second cycle of the fixed clock CLK_F and two unit delay steps are applied to a rising edge of a third cycle of the fixed clock CLK_F so that the second cycle of the modulated clock CLK_M has a cycle of T+2t. Four unit delay steps are applied to a falling edge of the third cycle of the fixed clock CLK_F and six unit delay steps are applied to a rising edge of a fourth cycle of the fixed clock CLK_F, so that the third cycle of the modulated clock CLK_M has a cycle of T+4t. Therefore, cycles of the modulated clock CLK_M increase gradually as T→T+2t→T+4t.

Then, seven unit delay steps are applied to a falling edge of the fourth cycle of the fixed clock CLK_F and eight unit delay steps are applied to a rising edge of a fifth cycle of the fixed clock CLK_F, so that the fourth cycle of the modulated clock CLK_M has a cycle of T+2t. Eight unit delay steps are applied to a falling edge of the fifth cycle of the fixed clock CLK_F and eight unit delay steps are applied to a rising edge of a sixth cycle of the fixed clock CLK_F, so that the fifth cycle of the modulated clock CLK_M again has a cycle of T. Accordingly, cycles of the modulated clock CLK_M decrease again.

As described above, a predetermined number of unit delay steps are applied to the rising and falling edges of the fixed clock CLK_F so that the modulated clock CLK_M has a cycle which sequentially changes as T→T+2t→T+4t→T+2t→T→T−2t→T−4t→T−2t→T while keeping its duty ratio of 50:50. This provides the modulated clock CLK_M with a characteristic of a reduced generation of EMI.

However, in such a configuration, a modulation rate of the modulated clock CLK_M in comparison with the fixed clock CLK_F cannot be changed because the delay time corresponding to one unit delay step is fixed. Accordingly, in order to further reduce an EMI generation, a spread spectrum clock generator which can provide the clock with a more appropriate modulation rate is needed.

SUMMARY OF THE INVENTION

Embodiments of the present invention are directed to providing a spread spectrum clock generator generating a modulated clock having various modulation rates with a fixed duty ratio by varying a delay time corresponding to a unit delay step.

In accordance with an aspect of the present invention, there is provided a spread spectrum clock generator for sequentially modulating a source clock of a fixed frequency with a predetermined frequency range, the spread spectrum clock generator including: a plurality of first loading units configured to delay clock edges of the source clock by a delay time corresponding to the number of unit delay steps determined by delay step control signals, wherein each of the first loading units comprises a plurality of second loading units each of which is configured to vary a delay value of each unit delay step by changing an inner interconnection configuration thereof in response to unit delay step control signals.

In accordance with another aspect of the present invention, there is provided a spread spectrum clock generator for sequentially modulating a source clock of a fixed frequency to have a predetermined frequency range, the spread spectrum clock generator including: a rising loading unit configured to delay a rising edge of the source clock by a delay time corresponding to the number of rising unit delay steps determined by rising delay step control signals; and a falling loading unit configured to delay a falling edge of the source clock by a delay time corresponding to the number of falling unit delay steps determined by falling delay step control signals, wherein each of the rising and falling loading units includes a plurality of variable loading units each of which is configured to vary a delay value of each of the rising and falling unit delay steps by changing an inner interconnection configuration thereof in response to unit delay step control signals.

DESCRIPTION OF SPECIFIC EMBODIMENTS

Hereinafter, a spread spectrum clock generator in accordance with the present invention will be described in detail with reference to the accompanying drawings.

Figure 5:
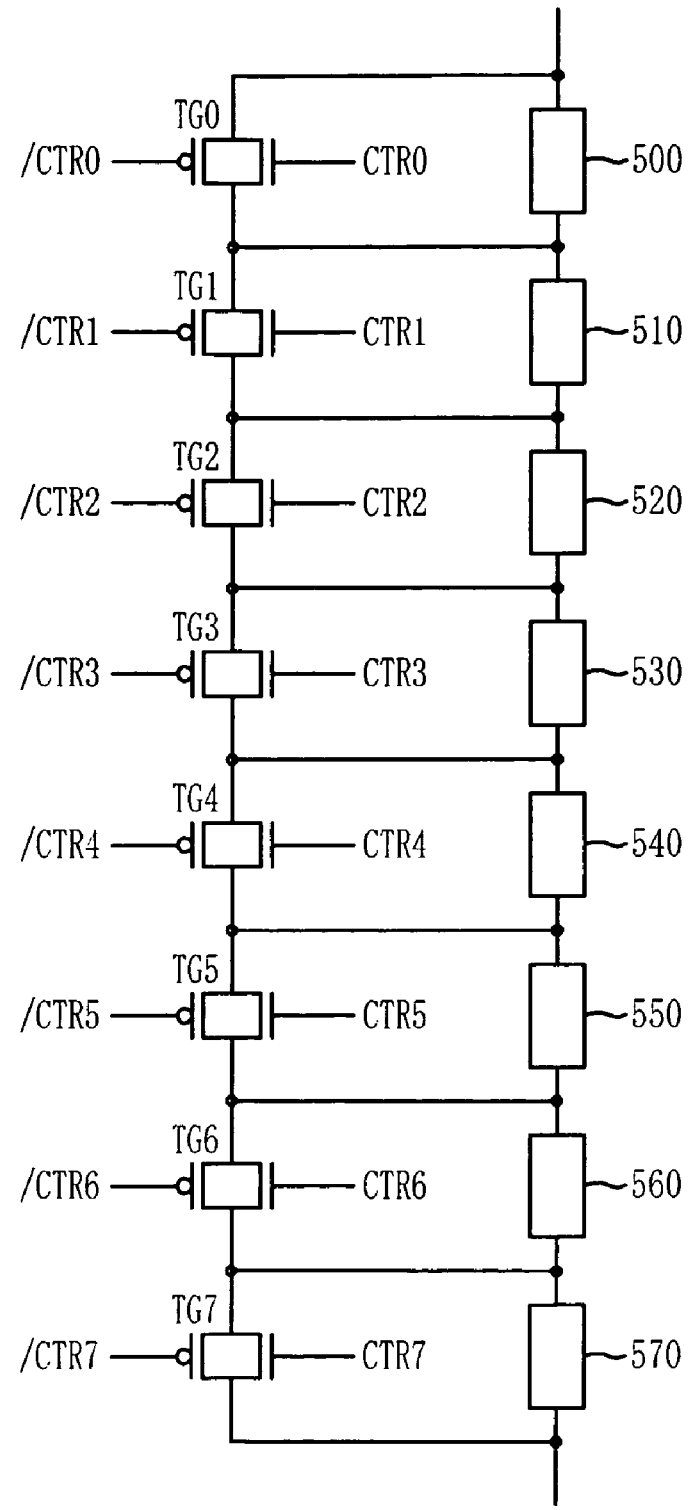
FIG. 5 is a circuit diagram illustrating a loading unit of a spread spectrum clock generator in accordance with an embodiment of the present invention.

FIG. 5 is a circuit diagram illustrating a loading unit of a spread spectrum clock generator in accordance with an embodiment of the present invention.

Figure 1:
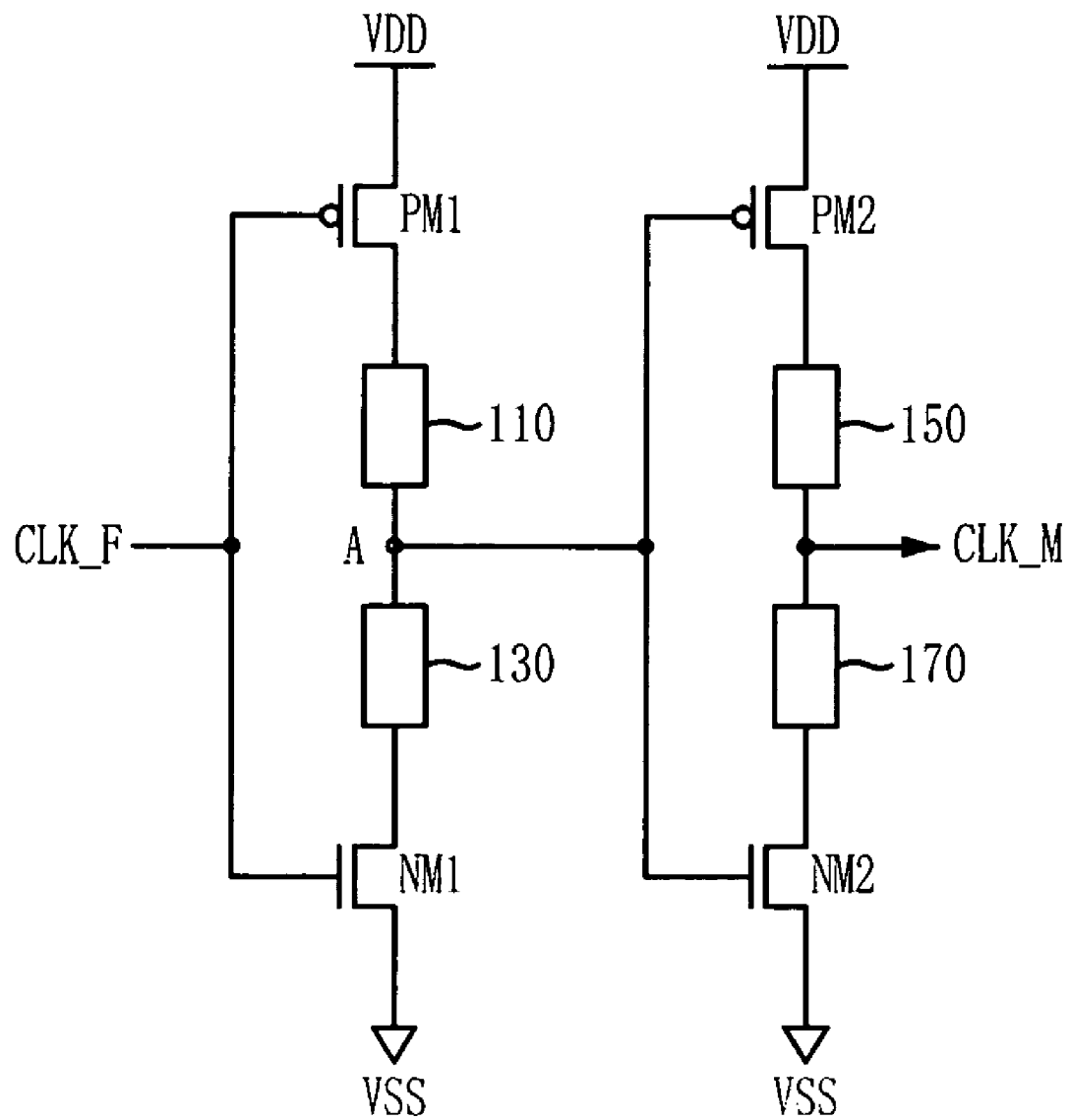
FIG. 1 is a circuit diagram illustrating a conventional spread spectrum clock generator.
Figure 2:
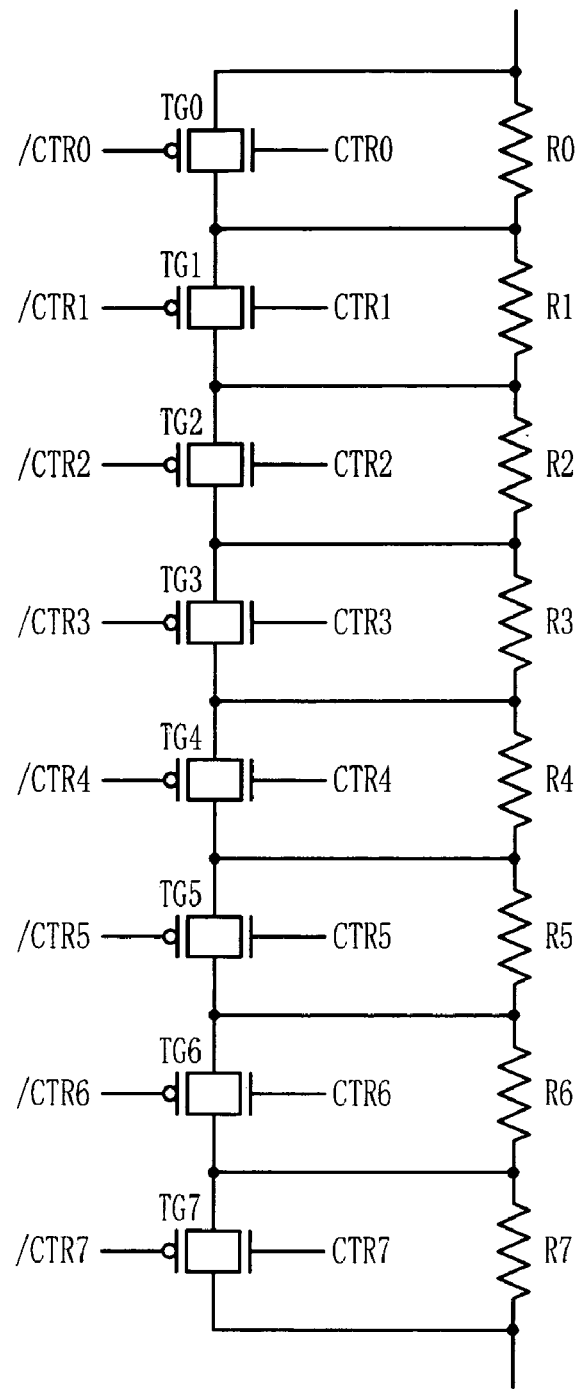
FIG. 2 is a circuit diagram illustrating a first rising loading unit of the conventional spread spectrum clock generator shown in FIG. 1.
Figure 3A:
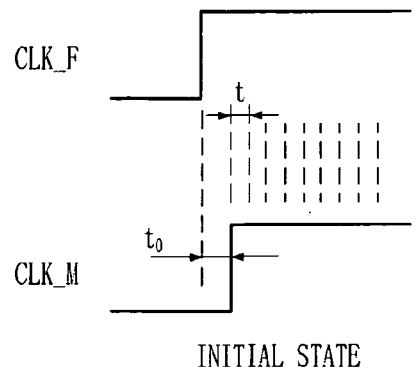
FIGS. 3A to 3C are timing diagrams illustrating a time delay performed by a first rising loading unit of the conventional spread spectrum clock generator shown in FIG. 1.
Figure 3B:
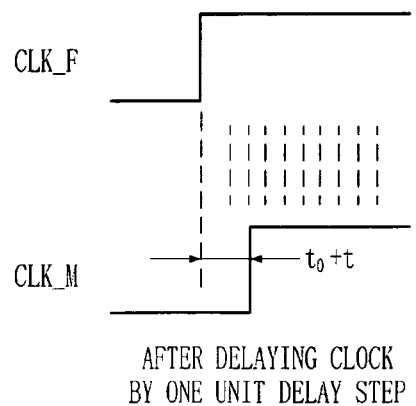
Figure 3C:
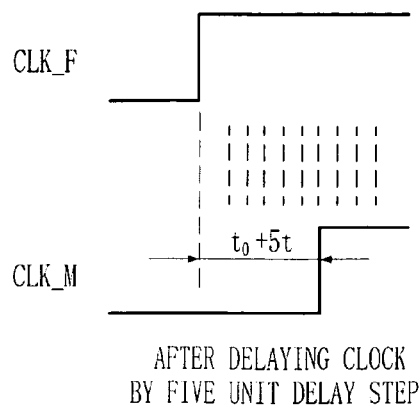
Figure 4:
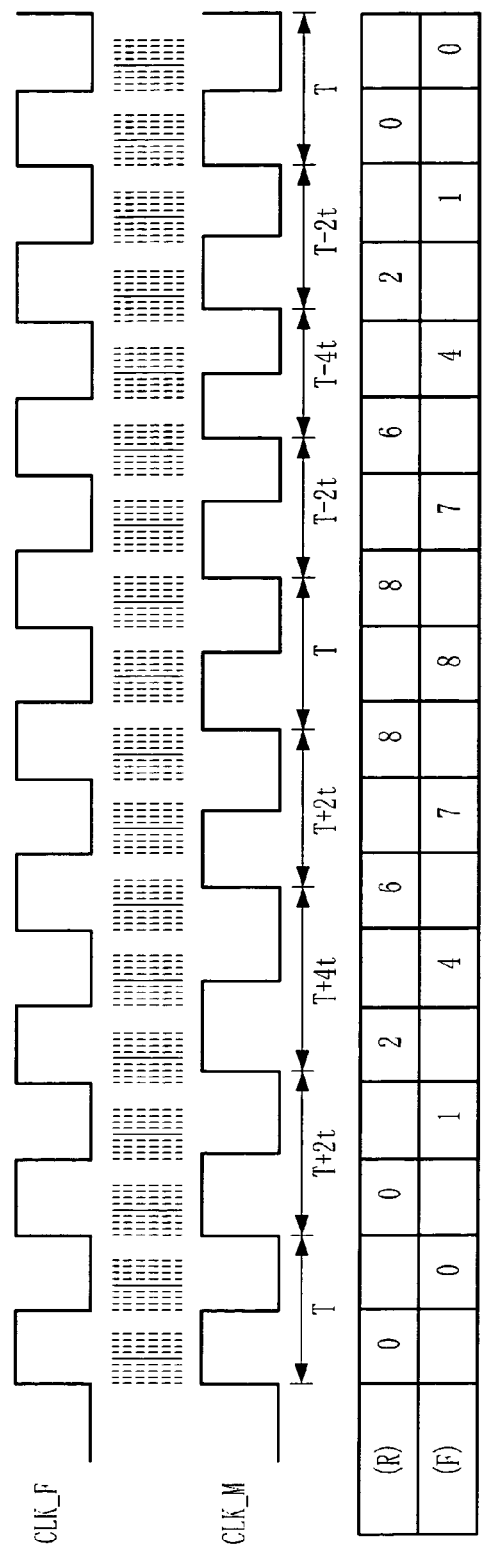
FIG. 4 illustrates a modulated clock generated by delaying a fixed clock by delay times determined at loading units of the conventional spread spectrum clock generator shown in FIG. 1.
Figure 4:
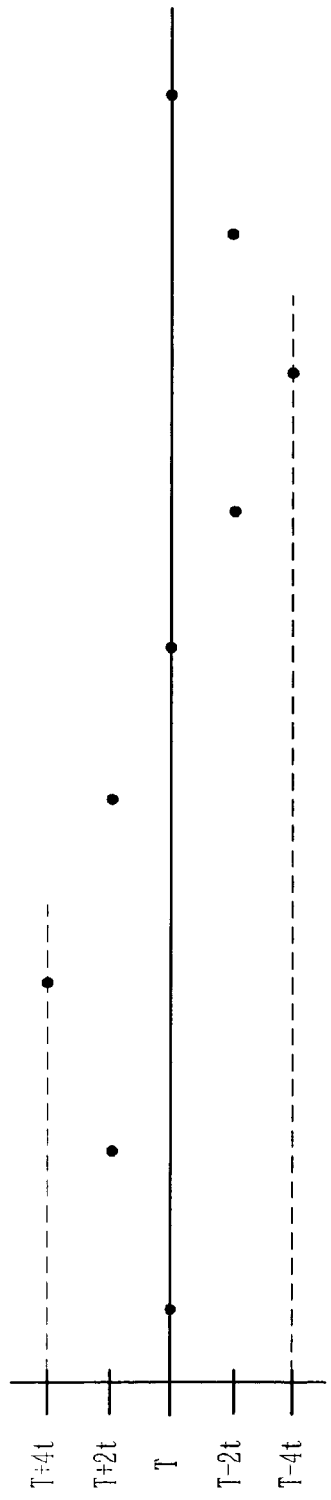

The loading unit in FIG. 5 may be one of the loading units 110, 130, 150 and 170 shown in FIG. 2. The loading unit delays a clock edge of a fixed clock CLK_F, which is a source clock, by a delay time corresponding to the number of unit delay steps determined by delay step control signals CTR0, CTR1, CTR2, CTR3, CTR4, CTR5, CTR6 and CTR7. Although the spread spectrum clock generator including two rising loading units and two falling loading units are illustrated in FIG. 2, the present invention is not limited thereto. The spread spectrum clock generator may also include only one rising loading unit and one falling loading unit.

The loading unit may include loading circuits 500, 510, 520, 530, 540, 550, 560 and 570 and transfer gates TG0, TG1, TG2, TG3, TG4, TG5, TG6 and TG7. The inner interconnection configuration of each of the loading circuits 500, 510, 520, 530, 540, 550, 560 and 570 can be changed in response to unit delay step control signals so that a delay time corresponding to one unit delay step thereof may be changed (see FIG. 6). The transfer gates TG0, TG1, TG2, TG3, TG4, TG5, TG6 and TG7 correspond to the respective loading circuits 500, 510, 520, 530, 540, 550, 560 and 570. The transfer gates TG0, TG1, TG2, TG3, TG4, TG5, TG6 and TG7 allow the respective loading circuits 500, 510, 520, 530, 540, 550, 560 and 570 to be bypassed in response to the respective delay step control signals CTR0, CTR1, CTR2, CTR3, CTR4, CTR5, CTR6 and CTR7.

That is, the number of the loading circuits to be bypassed is determined at the transfer gates TG0, TG1, TG2, TG3, TG4, TG5, TG6 and TG7 in response to the delay step control signals CTR0, CTR1, CTR2, CTR3, CTR4, CTR5, CTR6 and CTR7. For example, when only one transfer gate is turned off by the delay step control signals CTR0, CTR1, CTR2, CTR3, CTR4, CTR5, CTR6 and CTR7, a time duration corresponding to one unit delay step and corresponding again to one loading circuit is set as the delay time. When five transfer gates are turned off, a time duration corresponding to five unit delay steps and corresponding again to five loading circuits is set as the delay time.

Figure 6:
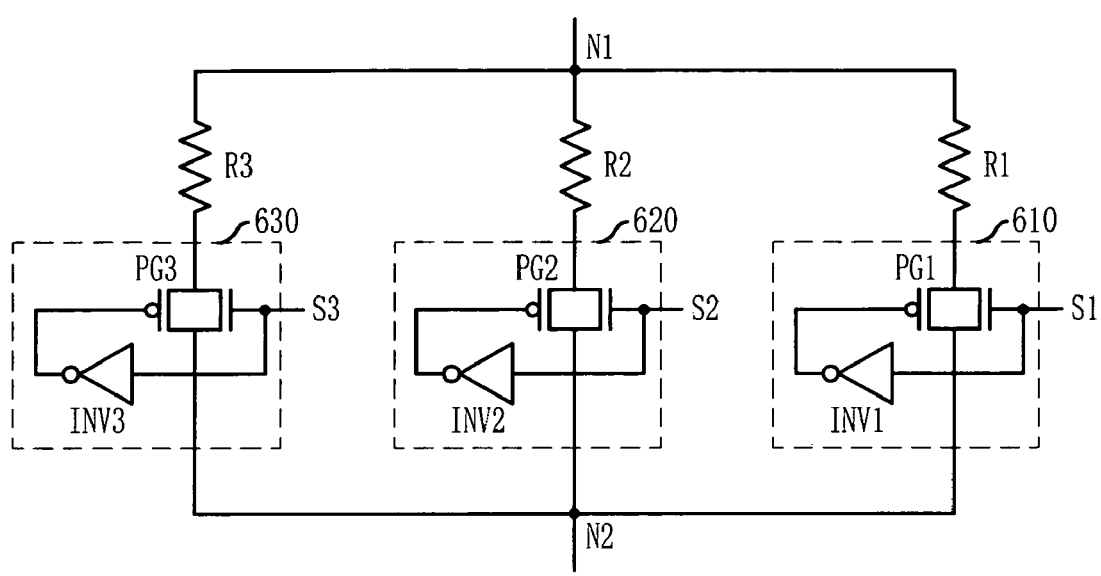
FIG. 6 is a circuit diagram illustrating a loading circuit of the loading unit of the spread spectrum clock generator shown in FIG. 5.

FIG. 6 is a circuit diagram illustrating the first loading circuit 500 of the loading unit of the spread spectrum clock generator shown in FIG. 5 which can change a time duration corresponding to a unit delay step.

All the loading circuits 500, 510, 520, 530, 540, 550, 560 and 570 may have substantially the same circuit configuration. However, to a different loading circuit may be input a different set of delay step control signals CTR0, CTR1, CTR2, CTR3, CTR4, CTR5, CTR6 and CTR7.

Referring to FIG. 6, the loading circuit includes a first node N1, a second node N2, first to third resistors R1, R2 and R3 and first to third connectors 610, 620 and 630. The first to third resistors R1, R2 and R3 are connected in parallel between the first node N1 and the second node N2. The first to third connectors 610, 620 and 630 connect the respective resistors R1, R2 and R3 to the second node N2 in response to the respective unit delay step control signals S0, S1 and S2.

The first connector 610 includes a first inverter INV1 and a first transfer gate PG1. The first inverter INV1 inverts the first unit delay step control signal S1. The first transfer gate PG1 connects the first resistor R1 and the second node N2 in response to the first unit delay step control signal S1 and an output signal of the first inverter INV1.

The second connector 620 includes a second inverter INV2 and a second transfer gate PG2. The second inverter INV2 inverts the second unit delay step control signal S2. The second transfer gate PG2 connects the second resistor R2 and the second node N2 in response to the second unit delay step control signal S2 and an output signal of the second inverter INV2.

The third connector 630 includes a third inverter INV3 and a third transfer gate PG3. The third inverter INV3 inverts the third unit delay step control signal S3. The third transfer gate PG3 connects the third resistor R3 and the second node N2 in response to the third unit delay step control signal S3 and an output signal of the third inverter INV3.

For example, when all the three resistors R1, R2 and R3 have the same resistance, R, resistance of the loading unit may be varied among R, $\frac{1}{2} \times R$ and $\frac{1}{3} \times R$ according to the unit delay step control signals S1, S2 and S3. It is preferable that all the loading circuits 500, 510, 520, 530, 540, 550, 560 and 570 have the same circuit configuration and receive the same first unit delay step control signal S1, the same second unit delay step control signal S2 and the same third unit delay step control signal S3. For example, when a reference resistance is $\frac{1}{2} \times R$, resistance larger than or smaller than the reference resistance may also be applied to the clock.

As described above, the resistance of each of the loading circuits 500, 510, 520, 530, 540, 550, 560 and 570 can be varied, whereby the delay time corresponding to one unit delay step thereof can also be varied. Therefore, the modulated clock CLK_M in accordance with an embodiment of the present invention may have a much wider range of cycles.

Figure 7:
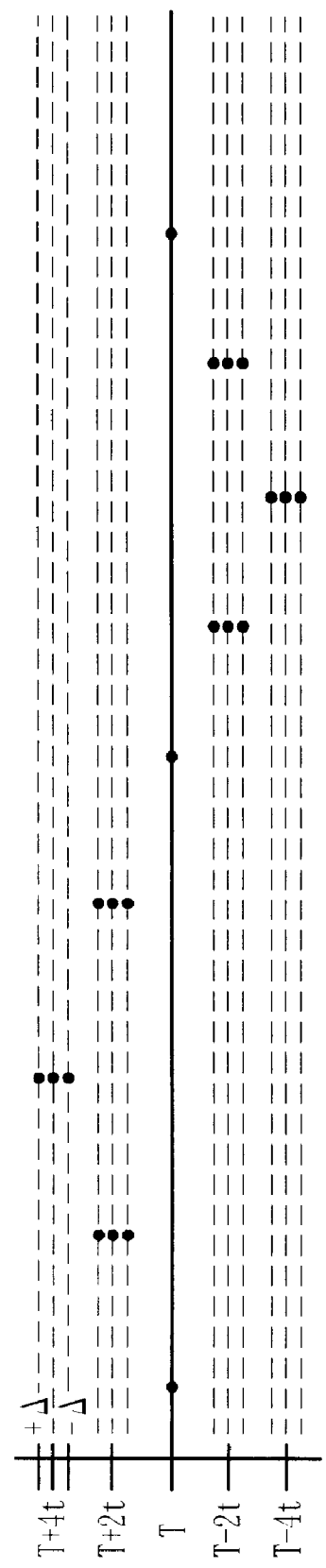
FIG. 7 is a graph illustrating a cycle of a modulated clock in accordance with an embodiment of the present invention.

FIG. 7 is a graph illustrating a cycle of the modulated clock CLK_M in accordance with an embodiment of the present invention.

Referring to FIG. 7, the modulated clock CLK_M in accordance with the embodiment of the present invention may have two more cycles denoted as $+\Delta$ and $-\Delta$ for each cycle in comparison with that generated by a typical spread spectrum clock generator. Hereinafter, the delay step control signals will be assumed to be identical to those of the typical spread spectrum clock generator, for convenience.

Operations of a spread spectrum clock generator in accordance with an embodiment of the present invention will now be described in detail with reference to FIGS. 6 and 7.

It is assumed that when the first unit delay step control signal S1 and the second unit delay step control signal S2 are activated so that a delay time of a unit delay step corresponding to two resistors R1 and R2 is provided by each of loading circuits 500, 510, 520, 530, 540, 550, 560 and 570, a cycle of the modulated clock CLK_M varies as T→T+2t→T+4t→T+2t→T→T−2t→T−4t→T−2t→T.

Then, when only the first unit delay step control signal S1 is activated so that a delay time of a unit delay step corresponding to the first resistor R1 is provided by each of the loading circuits 500, 510, 520, 530, 540, 550, 560 and 570, the cycle of the modulated clock CLK_M varies as T T→T+2t+Δt→T+4t+Δt→T+2t+Δt→T+Δt→T−2t−Δt→T−4t−Δt→T−2t−Δt→T.

Further, when all the unit delay step control signal S1, S2 and S3 are activated so that a delay time of a unit delay step corresponding to all the resistors R1, R2 and R3 is provided by each of the loading circuits 500, 510, 520, 530, 540, 550, 560 and 570, the cycle of the modulated clock CLK_M varies as T→T+2t−Δt→T+4t−Δt→T+2t−Δt→T→T−2t+Δt→T−4t+Δt→T−2t+Δt→T.

Consequently, by changing a delay time of a unit delay step, the cycle of the modulated clock CLK_M can be variously changed, whereby a modulation rate can also be changed.

As described above, the spread spectrum clock generator in accordance with an embodiment of the present invention can change a delay time corresponding to each unit delay step. Therefore, the spread spectrum clock generator can generate a modulated clock having a various modulation rate with a fixed duty ratio to thereby reduce an EMI generation efficiently.

While the present invention has been described with respect to the specific embodiments, it will be apparent to those skilled in the art that various changes and modifications may be made without departing from the spirit and scope of the invention as defined in the following claims.

For example, although a loading unit including three resistors is described in the above embodiment, the present invention is not limited thereto. The loading unit may also include more resistors. Furthermore, the positions and types of the logic gates and the transistors may be changed with the logic levels of the input signals.

What is claimed is:

1. A spread spectrum clock generator for sequentially modulating a source clock of a fixed frequency, the spread spectrum clock generator comprising:
a plurality of loading units, each comprising plurality of unit delay steps, wherein each unit delay step can be activated by a corresponding delay step control signal and comprises a plurality of circuit elements connected in parallel, each circuit element can be activated by a corresponding unit delay step control signal,
wherein the source clock is sequentially modulated with a frequency range that corresponds to a series of cycle times, the number of activated circuit elements in each activated unit delay step determines whether each cycle time of the source clock is to differ from a first cycle in the series.

2. The spread spectrum clock generator as recited in claim 1, wherein each of the plurality of loading units further comprises a plurality of switches corresponding to the plurality of unit delay step, each said switch configured to allow a corresponding unit delay step of said switch to be bypassed in response to a corresponding delay step control signal of said switch.

3. The spread spectrum clock generator as recited in claim 1, wherein the plurality of loading units comprises:
a rising loading unit configured to delay a rising edge of the source clock; and
a falling loading unit configured to delay a falling edge of the source clock.

4. The spread spectrum clock generator as recited in claim 1, wherein a resistance of each of the unit delay step varies according to a corresponding one of the unit delay step control signals.

5. The spread spectrum clock generator as recited in claim 4, wherein the resistance of each of the unit delay step becomes smaller than a reference resistance in response to the corresponding unit delay step control signal.

6. The spread spectrum clock generator as recited in claim 4, wherein the resistance of each of the unit delay step becomes greater than a reference resistance in response to the corresponding unit delay step control signal.

7. The spread spectrum clock generator as recited in claim 1, wherein each of the unit delay step comprises:
   a plurality of resistors connected to a first node in parallel; and
   a plurality of connectors each of which is configured to connect a corresponding one of the plurality of resistors to a second node in response to a corresponding one of the unit delay step control signals.

8. The spread spectrum clock generator as recited in claim 7, wherein each of the connectors comprises:
   an inverter configured to invert the corresponding unit delay step control signal; and
   a transfer gate configured to connect the corresponding resistor to the second node in response to the corresponding unit delay step control signal.

9. A spread spectrum clock generator for sequentially modulating a source clock of a fixed frequency, the spread spectrum clock generator comprising:
   a rising loading unit having a plurality of rising unit delay steps and configured to delay a rising edge of the source clock by a delay time corresponding to the number of rising unit delay steps determined by rising delay step control signals; and
   a falling loading unit having a plurality of falling unit delay steps and configured to delay a falling edge of the source clock by a delay time corresponding to the number of falling unit delay steps determined by falling delay step control signals,
   wherein each of the rising unit delay steps and the falling unit delay steps can be activated by a corresponding delay step control signal and comprises a plurality of circuit elements connected in parallel, each circuit element can be activated by a corresponding unit delay step control signal,
   wherein the source clock is sequentially modulated with a frequency range that corresponds to a series of cycle times, the number of activated circuit elements in each activated unit delay step determines whether each cycle time of the source clock is to differ from a first cycle in the series.

10. The spread spectrum clock generator as recited in claim 9, wherein the rising and falling loading units comprises a plurality of switches corresponding to the rising and falling unit delay steps, each of which is configured to allow the corresponding rising or falling unit delay step to be bypassed in response to a corresponding one of the rising and falling delay step control signals.

11. The spread spectrum clock generator as recited in claim 9, wherein a resistance of each of the rising and falling unit delay steps varies according to a corresponding one of the unit delay step control signals.

12. The spread spectrum clock generator as recited in claim 11, wherein the resistance of each of the rising and falling unit delay steps becomes smaller than a reference resistance in response to the corresponding unit delay step control signal.

13. The spread spectrum clock generator as recited in claim 11, wherein the resistance of each of the rising and falling unit delay steps becomes greater than a reference resistance in response to the corresponding unit delay step control signal.

14. The spread spectrum clock generator as recited in claim 9, wherein each of the rising and falling unit delay steps comprises:
   a plurality of resistors connected to a first node in parallel; and
   a plurality of connectors each of which is configured to connect to a corresponding one of the plurality of resistors and a second node in response to a corresponding one of the unit delay step control signals.

15. The spread spectrum clock generator as recited in claim 14, wherein each of the connectors comprises:
   an inverter configured to invert the corresponding unit delay step control signal; and
   a transfer gate configured to connect the corresponding resistor and the second node in response to the corresponding unit delay step control signal.

* * * * *